United States Patent

Schustek et al.

[11] Patent Number: 6,107,718
[45] Date of Patent: Aug. 22, 2000

[54] STATOR FOR AN ELECTRICAL MACHINE

[75] Inventors: Siegfried Schustek, Ditzingen; Peter Franz, Diekholzen, both of Germany

[73] Assignee: Robert Bosch GmbH, Stuttgart, Germany

[21] Appl. No.: 09/043,815

[22] PCT Filed: Oct. 29, 1996

[86] PCT No.: PCT/DE96/02053

§ 371 Date: Mar. 27, 1998

§ 102(e) Date: Mar. 27, 1998

[87] PCT Pub. No.: WO97/24792

PCT Pub. Date: Jul. 10, 1997

[30] Foreign Application Priority Data

Dec. 30, 1995 [DE] Germany ............ 195 49 180

[51] Int. Cl.[7] ............ H02K 1/06; H02K 1/12; H02K 3/00; H02K 15/04

[52] U.S. Cl. ............ 310/218; 310/216; 310/180; 310/254; 310/258; 310/259; 310/208; 29/596; 29/598

[58] Field of Search ............ 310/203, 206, 310/207, 208, 218, 254, 258, 259, 216; 29/596, 597, 598

[56] References Cited

U.S. PATENT DOCUMENTS

| | | | |
|---|---|---|---|
| 3,914,859 | 10/1975 | Pierson | 29/596 |
| 3,983,433 | 9/1976 | Sims | 310/216 |
| 4,071,788 | 1/1978 | Martin et al. | 310/42 |
| 4,280,275 | 7/1981 | Mitsui | 29/732 |
| 4,712,035 | 12/1987 | Forbes et al. | 310/269 |
| 4,816,710 | 3/1989 | Silvaggio et al. | 310/194 |
| 4,852,246 | 8/1989 | Rochester | 29/596 |
| 4,857,787 | 8/1989 | Taji et al. | 310/180 |
| 5,570,503 | 11/1996 | Stokes | 29/596 |

FOREIGN PATENT DOCUMENTS 1 908 323  10/1969  Germany .

*Primary Examiner*—Nestor Ramirez
*Assistant Examiner*—Tran N Nguyen
*Attorney, Agent, or Firm*—Michael J. Striker

[57] ABSTRACT

In a stator (11) for an electrical machine, in particular for a starter motor in motor vehicles, having an exciter winding (22) with a plurality of windings that is wrapped randomly around the poles (14, 14'), in order to create great freedom in terms of the shape of the exciter winding (22) with a sufficiently high coupling factor and an acceptable axial overhang of the end winding, each winding of the exciter winding (22) is embodied as a bundle conductor comprising a plurality of parallel-wound round wires (23) that are adjacent one another on the face ends of the poles (14, 14'). In the region from the face end of a preceding pole (14) to the face end of the next pole (14'), the round wires (23) of each bundle conductor extend obliquely to the yoke axis, and in that region are twisted together by at least 180° (FIG. 1).

11 Claims, 2 Drawing Sheets

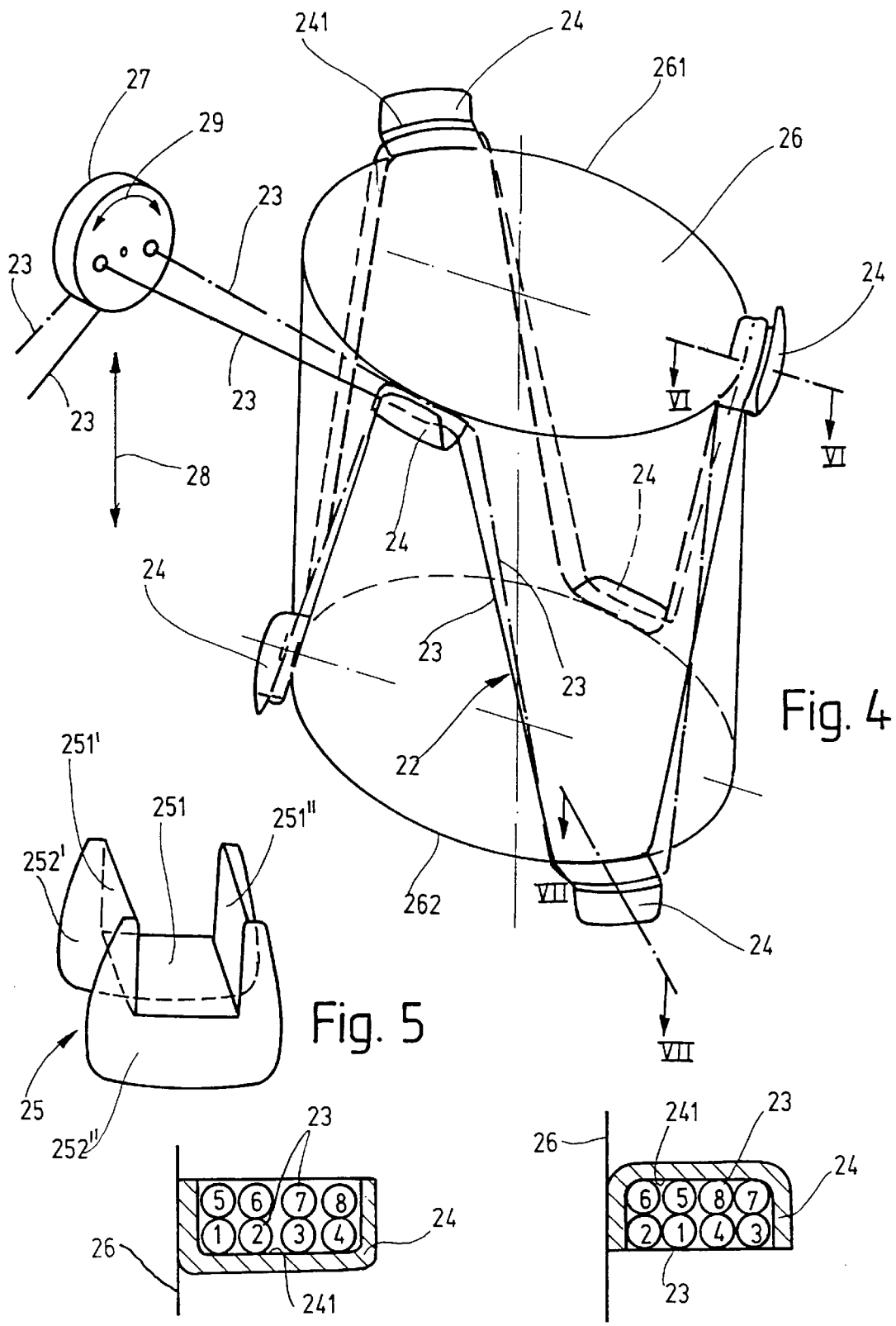

6,107,718

STATOR FOR AN ELECTRICAL MACHINE

BACKGROUND OF THE INVENTION

The invention is based on a stator for an electrical machine, in particular for a starter motor in motor vehicles.

In a known stator of this type (German Patent Disclosure DE 19 08 323 A1), the exciter winding wrapped randomly around the poles is shaped into a self-contained curved coil with axially parallel soil segments and two electrical coil terminals. The semicircular end windings that connect the axially parallel coil segments rest in recesses on the face ends of the poles, so that the axial length of the coil is practically the same as the axial length of the yoke or pole ring. The space between the successive poles is completely filled by the axially parallel coil segments. In the production of a random coil, the point of departure is a circular-annular coil, which is conventionally armored and bent to form the random coil. The poles are detachably connected to the yoke. When the stator is assembled, first only every other pole is connected to the yoke, and the random coil is inserted after that, with every other end winding of the coil inserted into recesses on the faces ends of the poles. After that, the remaining poles are placed in the yoke and displaced axially until the recesses on their face ends fit over the remaining end windings.

SUMMARY OF THE INVENTION

The stator according to the invention has the advantage that because individual round-wire conductors are used, there is greater freedom in terms of the shape of the exciter winding. The pole core can be made higher, and hence the winding can be distributed more uniformly, without such a pronounced axial length. Because the individual round wires are twisted inside a bundle conductor that forms a winding, the coil becomes more solid, making it stiff and stable enough to be manufactured outside the stator and then inserted into the yoke. The exciter winding of the invention has on only slightly lower coupling factor than an exciter winding in which the exciter poles have round wire wound directly onto them, with a marked advantage in terms of production because of being prefabricated outside the yoke. In addition, the effort and expense for interconnecting a random winding that has only one beginning of a winding and one end of a winding is markedly less than for directly wound exciter poles, where all the winding terminals of the individual poles require interconnection. Because the round wires on the outer face ends of the poles are adjacent and parallel to one another, the end winding overhang remains within acceptable limits and is only 1.5 to 1.7 times greater than in the case of direct winding-on of the exciter poles.

In a preferred embodiment of the invention, the twisting of the round wires between two successive poles is done at a rotary angle of 180° or an integral multiple of 180°. At a rotary angle of 180° or an odd-numbered multiple of 180°, the adjacent round wires on the face ends of successive poles change places in successive poles, while at a rotary angle of an even-numbered multiple of 180°, they keep the same position on all the poles. Twisting the round wires by 180° already suffices to achieve adequate stiffness of the random winding and to allow its prefabrication outside the stator and subsequent insertion into the stator.

For technical reasons involving windings, in an advantageous embodiment of the invention, the twist of the round wires of a bundle conductor is embodied with the same rotary angle in opposite directions within two regions, immediately succeeding one another in the winding direction, between two poles, for example being 180° clockwise in one such region and 180° counterclockwise in the next.

In a preferred embodiment of the invention, the poles in progressive order are connected to the yoke permanently in one instance and detachably in the next, and the yoke and the poles are put together as a packet comprising a plurality of full-thickness sheet-metal stampings. Because of this structural provision, the loss of material involved in the stamping is kept extremely low, above all if the rotor is stamped out at the same time in the same full-thickness stamping step.

BRIEF DESCRIPTION OF THE DRAWING

The invention is described in detail in the ensuing description of exemplary embodiments shown in the drawing.

FIG. 4 is a perspective view of a winding device to demonstrate the buildup of the windings of the exciter winding of the starter motor of FIGS. 1–3;

FIG. 5 is a perspective view of a winding mask for receiving the end windings of the exciter winding of FIG. 4; and FIGS. 6 and 7 each show a sectional view taken along the lines VI—VI and VII—VII, respectively, of FIG. 4.

DESCRIPTION OF THE PREFERRED EMBODIMENTS

Figure 1:
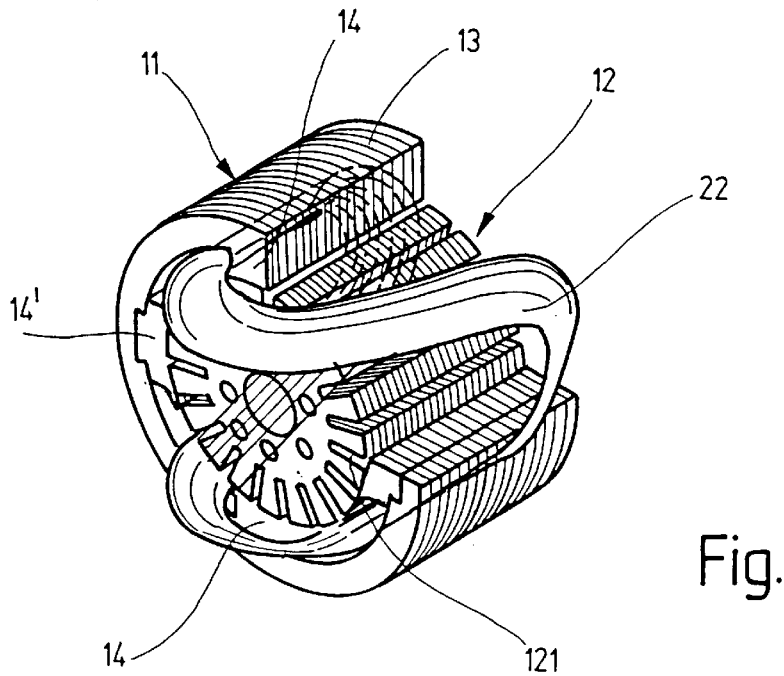
FIG. 1 is a perspective view of a starter motor for motor vehicles, shown partly schematically at cut away.
Figure 2:
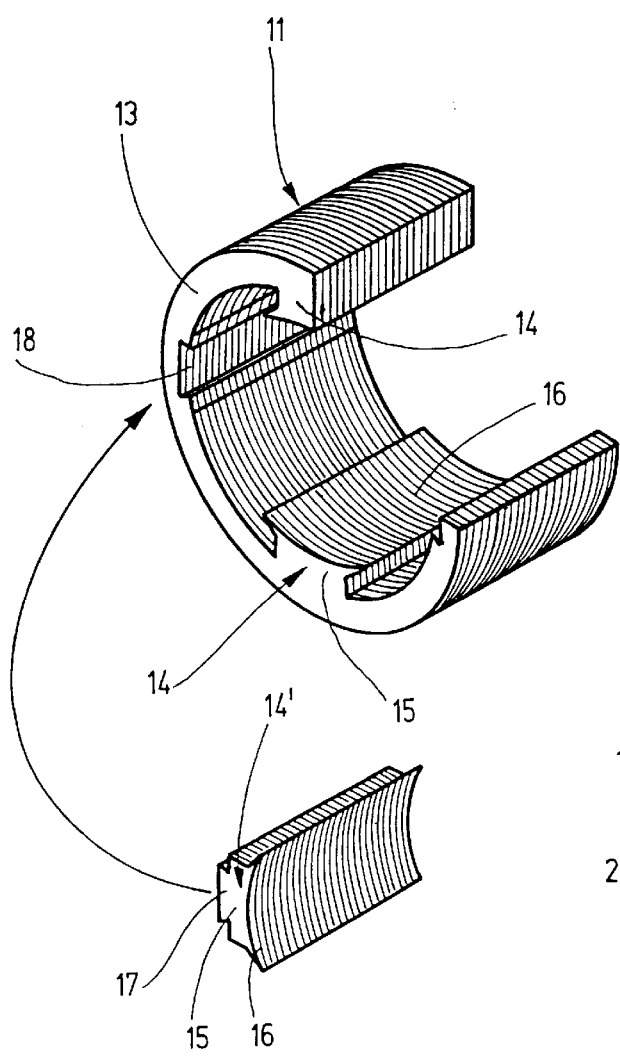
FIG. 2 is a perspective view of a yoke segment of the starter motor of FIG. 1 with a pole pulled off from the yoke.
Figure 3:
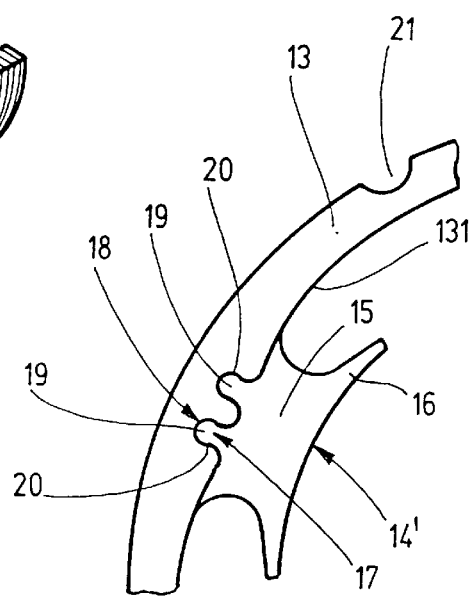
FIG. 3 is a fragmentary end view of a stator for a starter motor in a further exemplary embodiment.

The starter motor for a motor vehicle, shown in FIG. 1 in perspective as an example of an arbitrary electrical machine, has a stator 11, secured in a housing not shown here, and a rotor 12, which revolves around the stator and is seated in a manner fixed against relative rotation on a power takeoff shaft, not shown here, that is mounted in the housing. The stator 11 has a hollow-cylindrical yoke 13, also known as a pole ring, from which a number of poles 14, 14' protrude radially inward. Half of all the poles, here marked 14, are embodied integrally with the yoke 13, while the other half of the poles 14' are detachable from the yoke 13. In the direction of revolution of the yoke 13, one fixed pole 14 always alternates with one detachable pole 14'. Each pole 14, 14', in a known manner, comprises a pole core 15 and a pole shoe 16 formed onto the free end of the pole core 15, and extends over the axial length of the yoke 13. In the case of the detachable poles 14', the pole core 15 has an insertable shoe 17, on its end remote from the pole shoe 16, that can be inserted form-lockingly into an axial shoe guide 18 in the yoke 13. In the stator 11 of FIGS. 1 and 2, the insertable shoe 17 and the shoe guide 18 are embodied in a known dovetail construction, while in FIG. 3 the insertable shoe 17 is embodied by two parallel ribs 19 of round profile, and the shoe guide 18 is embodied by two parallel grooves 20 of circularly round cross section in the yoke 13. As can be seen particularly clearly from FIG. 3, the inner wall 131 of the yoke is flattened across the tangential width of the pole core 15 of the detachable poles 14', so that the pole core 15 rests flat on the inner wall 131 of the yoke. As the result, there is a large crossover area for the magnetic flux, with only a very slight air gap. The yoke 13, the poles 14, 14' with the pole core 15 and the pole shoe 16, as well as the rotor 12, are made by stamping from metal sheets; in a single full-volume cut, one lamination of the yoke 13 having the stationary poles 14, one lamination of all the detachable poles 14', and one lamination having the rotor 12 with the slots 121 are produced. The individual laminations are then each put together to form a lamination packet. Because the full-volume stamping technique produces little waste, favorable contours of the pole shoes 16 can be formed for guiding the magnetic flux, and recesses 21 can be made at little effort to accommodate threaded screws.

An exciter winding 22 that has a plurality of windings in one or more layers is wrapped around the poles 14, 14' and extends around successive poles 14, 14' alternatingly on axially outward-pointing face ends facing away from one another, and between the poles 14, 14' along the inner wall 131 of the yoke, it extends obliquely to the yoke axis. Each winding of the exciter winding 22 is formed by a so-called bundle conductor, which comprises a plurality of round wires 23 that are adjacent one another on the face ends of the poles 14, 14', radially to the yoke axis. In the region extending from the face end of a preceding pole 14 to the face end of the next pole 14', the round wires 23 are turned or twisted together about an angle of 180° such that the individual round wires 23 of one bundle conductor change places on the face end of the preceding pole 14 compared to their respective positions on the face end of the succeeding pole 14'. Along the way to the next pole 14 in the winding direction, the individual round wires 23 in the bundle conductor are turned oppositely thereto, in other words by minus 180° C., so that they then resume their preceding position. This twisting about an angle of 180° or −180° of the individual round wires 23 within the bundle conductor is repeated continuously in the region between the poles 14, 14' and in the region between the poles 14', 14. At the beginning and end of each winding, the individual round wires 23 are each soldered or welded to one conductor terminal.

To illustrate the structure of the exciter winding 22 sketched in FIG. 1, which is prefabricated, outside the stator 11, in the form of a random coil, FIG. 4 schematically shows the winding device for the exciter winding 22. A winding drum 26, on its circumference, has prongs 24 offset from one another on both face-end edges; the number of prongs is equivalent to the number of poles 14, 14' in the stator 11. In FIG. 4, as an example, an exciter winding 22 for a six-poled stator 11 is shown. On each end edge 261 and 262 of the winding drum 26, three prongs 24 each are disposed over the drum circumference, offset from one another by 120°. Each prong 24 has a guide face 241 for receiving the round wires 23, and a plastic mask 25, such as that shown in FIG. 5, can also be slipped onto this guide face. The plastic mask 25 is embodied such that with a U-shaped strut 251, it can be slipped axially onto the outer face end of the poles 14, 14'; the strut 251 is slipped with two legs 251' and 251" onto the axially extending faces of the pole cores 15. On each of sides radially opposed to the yoke axis, the strut 251 carries one axially protruding flange 252' and 252", respectively. The end winding of the exciter winding 22 is retained between the two flanges 252' and 252".

To illustrate the winding structure, FIG. 4 shows two parallel-wound round wires 23 of one winding or bundle conductor of the exciter winding 22; one round wire 23 is shown in solid lines, and the other round wire 23 is shown in dot-dashed lines. Both round wires 23 are guided simultaneously about the individual prongs 24, which will later be replaced, upon insertion of the exciter winding 22 in the stator 11, by the poles 14, 14'; on the guide faces 241 of the prongs 24, the round wires are adjacent one another in the radial direction of the winding drum axis, and from the preceding prong 24 to the next prong 24 they extend obliquely over the outer jacket of the winding drum 26, or in other words extend at an acute angle to the winding drum axis, and in this region are turned 180° about one another. By this turning or twisting, the one round wire 23, shown in dot-dashed lines in FIG. 4, rests on the inside, that is, closest to the drum jacket, on all the guide faces 241 of the prongs 24 that are disposed on the end edge 261 of the winding drum 26, while the prongs 24 that are disposed on the end edge 262 of the winding drum 26 rest on the outside of the guide faces 241, or in other words farther away from the drum jacket. Conversely, the other round wire 23, shown in solid lines in FIG. 4, rests on the outside of the guide faces 241 of the prongs 24 on the end edge 261 of the winding drum 26, and as a result of the twisting now rest on the inside of the guide face 241 of the prongs 24 on the face end 262 of the winding drum 26. One winding or bundle conductor of the exciter winding 26 is typically wound parallel, comprising from two to five individual round wires 23.

To further illustrate the effect of the twisting, in FIGS. 6 and 7 a section along the lines VI—VI and VII—VII, respectively, in FIG. 4 each show one of two prongs 24 succeeding one another in the winding direction, in the case of an exciter winding 22 having two round wires 23 per winding or bundle conductor, and four windings that are wound in two layers. In each bundle conductor, the individual round wires 23 are numbered sequentially. Thus the first bundle conductor includes the round wires 23 numbered 1 and 2; the second bundle conductor includes the round wires 23 marked 3 and 4; the third bundle conductor includes the round wires numbered 5 and 6; and finally, the fourth bundle conductor includes the round wires numbered 7 and 8. On the guide face 241 of the prong 24 on the end edge 261 of the winding drum 26, the round wire 23 that carries number one in the first bundle conductor is located on the inside, that is, closest to the outer jacket of the winding drum 26. The round wire 23 numbered two is located next to it (FIG. 6). After the twisting, the two round wires 23 numbered 1 and 2 have changed places (FIG. 7) on the next prong 24 on the end edge 262 of the winding drum 26. Correspondingly, the round wires 23 numbered 3 and 4 in the next bundle conductor, because of their twisting, change places on the guide faces 241 of successive prongs 24. The same is true for the round wires 23 of the third and fourth bundle conductor, numbered 5 and 6, and 7 and 8, respectively. Each bundle conductor, with the two round wires 23, is wrapped continuously around the prongs 24 from the beginning around the prongs 24 from the beginning of the exciter winding 22 to the end thereof, and the two round wires 23 are each welded or soldered to a conductor terminal at the ends.

In order to accomplish this twisting of the individual round wires 23 within the bundle conductor from a production standpoint, the winding drum 26 is assigned a wire nozzle 27, schematically shown in FIG. 4, which continuously draws off two round wires in parallel from supply spools and delivers them to the winding drum 26, in such a way that they run up flat, adjacent one another, onto each prong 24 to be occupied. If the winding drum 26 is rotating counterclockwise as in FIG. 4, the wire nozzle 27 executes a stroke indicated by the arrow 28, which is equivalent to the axial spacing of two successive prongs 24 on the winding drum 26, and upon each stroke, the nozzle rotates 180° in one direction and by the same amount in the opposite direction (arrow 29 in FIG. 4) in the return stroke, whereupon the described twisting of the two round wires 23 in the region between two successive prongs 24 in the winding direction is achieved. By the contrary rotation of the wire nozzle 26 in the stroke and the return stroke, the twisting of the two round wires 23 in opposite directions in intermediate regions immediately succeeding one another in the winding direction between two poles 14, 14', or in other words clockwise in the one case and counterclockwise in the next. This alternating rotation of the wire nozzle 27 in the direction of the arrow 29 in FIG. 4 assures that the turning of the round wires 23 drawn from the supply spools is canceled out upon each return stroke in the direction ahead of the wire nozzle 27, and there twisting that would make it impossible to execute the winding operation cannot occur.

The thus-completed two-layer exciter winding 22 is removed from the winding drum 26, after the prongs 24 have been folded up into the winding drum 26, and is inserted into the stator 11, whose detachable poles 14' have previously been removed. Each end winding of the exciter winding 22 in the process presses against the outer face ends of the stationary poles 14 in the stator 11. Next, the poles 14' are inserted by their insertable shoes 17 into the shoe guides 18 in the yoke 13; in this process, the outer face ends of these poles 14' now press against the still unattached end windings of the exciter winding 22. The poles 14' are fixed between the drive bearing and the commutator bearing cap by wedging or clamping.

The invention is not limited to the exemplary embodiment described. For instance, the twisting of the round wires 23 of one winding or bundle conductor may also be executed by a multiple of 180°, for instance by 360°. In that case, the round wires assume the same position on all the prongs 24. Twisting by 180°, however, already suffices to achieve adequate stiffness of the random winding.

A preferred random winding is embodied with three round wires per bundle conductor and six windings. In this case, the wire nozzle 27 must be equipped with three delivery openings for three round wires 23 to be drawn off parallel from supply spools.

We claim:

1. A stator for an electrical machine, comprising a hollow-cylindrical yoke, a plurality of poles protruding inward from said yoke and extending over an axial length of said yoke; an exciter winding including a plurality of windings which are wrapped around each of said poles so as to alternatingly incompass each of said poles on axially each of said poles on axially outwardly pointing face ends of said poles facing away from one another and so as to extend between said poles along an inner wall of said yoke, each of said windings of said exciter winding being a bundle conductor which includes a plurality of parallel-wound round wires located side by side on said face ends of each of said poles, said poles including a first plurality of poles which are connected permanently to said yoke and a second plurality of poles which are detachably connected to said yoke, said poles of said first plurality and said poles of said second plurality alternating with one another, said poles being assembled as a packet, each of said poles having a pole core which contacts said yoke and a pole shoe provided on a free end of said pole core, said pole core having an end which is remote from said pole shoe, said yoke being provided with axial shoe guides, said detachable poles being formed as insertable poles which are form-lockingly inserted in said axial shoe guides in an axial direction, said inner wall of said yoke being flattened across a tangential width of said pole core of said detachable poles such that said pole core rests flatly on said inner wall of said yoke.

2. A stator for an electrical machine, comprising a hollow-cylindrical yoke, a plurality of poles protruding inward from said yoke and extending over an axial length of said yoke; an exciter winding including a plurality of windings which are wrapped around each of said poles so as to alternatingly incompass each of said poles on axially each of said poles on axially outwardly pointing face ends of said poles facing away from one another and so as to extend between said poles along an inner wall of said yoke, each of said windings of said exciter winding being a bundle conductor which includes a plurality of parallel-wound round wires located side by side on said face ends of each of said poles, said poles including a first plurality of poles which are connected permanently to said yoke and a second plurality of poles which are detachably connected to said yoke so that said detachable poles during insertion into said yoke in an axial direction press against said windings of said exciter winding and therefore determine a position of said exciter winding.

3. A stator as defined in claim 2, wherein the parallel-wound round wires are cabled or twisted together in a region between said poles.

4. A stator as defined in claim 2, wherein said windings are meanderingly wrapped around said poles.

5. A stator as defined in claim 2, wherein said round wires located side by side on said face ends of said poles are arranged radially to an axis of said yoke.

6. A stator as defined in claim 2, wherein said round wires are twisted in said region between two successive poles over 180°.

7. A stator as defined in claim 2, wherein said round wires are twisted in said region between two successive poles over an integral multiple of 180°.

8. A stator as defined in claim 2, wherein said windings are wrapped around said poles in a winding direction, said round wires being twisted in a direction of twist which is opposite in regions between two poles immediately succeeding one another in said winding direction.

9. A stator as defined in claim 2, wherein said poles of first plurality and said poles of second plurality alternate with one another, said poles being assembled as a packet.

10. A stator as defined in claim 9, wherein each of said poles has a pole core which contacts said yoke and a pole shoe provided on a free end of said pole core, said pole core having an end which is remote from said pole shoe, said yoke being provided with axial shoe guides, said detachable poles being formed as insertable poles which are form-lockingly inserted in said axial shoe guides in the axial direction.

11. A stator as defined in claim 2; and further comprising a plastic mask slipped over each face end of said poles, said masks between two flanges protruding at a right angle from said pole core and joined together by a strut clamped to said pole core receiving round wires of bundle conductors in one or more axially adjacent layers of said excitor winding.

* * * * *